United States Patent
Juang

[11] Patent Number: 5,999,636
[45] Date of Patent: Dec. 7, 1999

[54] APPARATUS AND PROCESS FOR INSPECTING PRINT MATERIAL

[75] Inventor: Ruddy J. Juang, Candia, N.H.

[73] Assignee: PrintProbe Technology, LLC, Candia, N.H.

[21] Appl. No.: 08/949,012

[22] Filed: Oct. 10, 1997

[51] Int. Cl.[6] .............................. G06K 9/00; G06K 9/64; H04N 7/18; G01N 21/86
[52] U.S. Cl. ........................... 382/112; 382/217; 348/88; 250/559.05; 250/559.06; 250/559.08
[58] Field of Search ..................................... 382/112, 217; 348/88; 250/559.01, 559.04, 559.05, 559.06, 559.07, 559.08

[56] References Cited

U.S. PATENT DOCUMENTS

| | | | |
|---|---|---|---|
| 4,311,914 | 1/1982 | Huber | 382/112 |
| 4,488,808 | 12/1984 | Kato | 356/73 |
| 4,561,103 | 12/1985 | Horiguchi et al. | 382/112 |
| 4,685,139 | 8/1987 | Masuda et al. | 382/112 |
| 4,969,203 | 11/1990 | Herman | 382/266 |
| 5,144,566 | 9/1992 | Anderson et al. | 382/112 |
| 5,440,402 | 8/1995 | Okuda et al. | 358/406 |
| 5,440,650 | 8/1995 | Hieda et al. | 382/112 |
| 5,548,691 | 8/1996 | Sato et al. | 395/113 |
| 5,559,896 | 9/1996 | Okuda et al. | 382/141 |
| 5,574,800 | 11/1996 | Inoue et al. | 382/149 |
| 5,608,453 | 3/1997 | Gerber et al. | 348/87 |
| 5,625,703 | 4/1997 | Okuda et al. | 382/112 |
| 5,768,438 | 6/1998 | Etoh | 382/251 |

*Primary Examiner*—Jon Chang
*Assistant Examiner*—Mehrdad Dastouri
*Attorney, Agent, or Firm*—Robert R. Deleault; Mesmer Law Offices, P.A.

[57] ABSTRACT

An apparatus and process for inspecting print material having a reference template generator circuit, a defect detector circuit for comparing a target image to a reference image and a defect rejecter circuit for determining the acceptability of the target image. The reference template generator circuit is made up of a pixel intensity range circuit, a pixel classifier circuit and a reference address circuit. Each pixel data of the target image is compared, according to the pixel classification of the pixel data, to each pixel data of the reference image. The flaw severity code is generated from the reference pixel comparison, which is then weighted and accumulated for the image area. The weighted sum of the occurrences of the flaw severity codes is compared with the user specified threshold for determining the acceptability of the test sample. Each entry of the look-up table contains a corresponding flaw severity code.

31 Claims, 6 Drawing Sheets

APPARATUS AND PROCESS FOR INSPECTING PRINT MATERIAL

BACKGROUND OF THE INVENTION

1. Field of the Invention

The present invention relates generally to an apparatus and process of inspecting printed material. Particularly, this invention relates to an apparatus and process of inspecting printed material by comparing a target image to one or more reference images. More particularly, this invention relates to an apparatus and process of inspecting printed material by comparing the intensity of each pixel in a target image to the average intensity according to the classification of each pixel in the reference image or images. Even more particularly, this invention relates to an apparatus and process of inspecting printed material capable of comparing the intensity of each pixel in a target image to the average intensity according to the classification of each pixel in a reference image or images on a web running at speeds as high as 1200 feet per minute while maintaining a high defect-detection sensitivity and relatively low computational cost.

2. Description of the Prior Art

Through the years devices and methods of inspecting print material have been developed. Several of these devices and methods of inspecting print material has been accomplished by comparing a target image to a reference image including a means for compensating the printing variation that exists during a print run. It is well known in the prior art that the flaw pattern of printed material can be detected by comparing the digital image representation of a target pattern with the digital image representation of a known good sample of such a pattern stored in memory. The digital image representations are generated by digitizing the signal of an optical pickup device such as CCD camera, all as is well known in the art.

The image comparison is accomplished by means of subtracting the digitized intensity value for each pixel in the target image from the intensity value of the corresponding pixel in the reference image. When the difference in the subtracted intensity of the pixels is above the tolerance limit, the pixel is said to contain a flawed pattern.

In reality, however, when the normal printing process variation is introduced, the digitized intensity of the pixels varies more significantly at the spatial location where the process variation occurs, than at other pixel locations in the rest of the image. The intensity tolerance of these affected pixels must therefore be increased to compensate for process variation. Otherwise, a false defect will be detected. An attempt to use a single tolerance for all pixels in the image will cause the entire image to be unnecessarily desensitized, rather than only the affected pixels.

In the multicolor printing press, the impression image of each color ink is transferred to the target material in separate processes. The printing process variation occurs when the web tension varies, the feeding velocity changes, the ink is replenished, the ambient temperature changes, etc. It is obvious that when the printing variation causes the ink impression on the printed material to be displaced, the digitized intensity values of the pixels that are spatially located at the edge of the printing pattern diverge more severely from their ideal reference intensity than the pixels that are located in the inner printing pattern or at the substrate area. Furthermore, the pixel intensities in the inner printing pattern of uniform ink density varies less than the pixels in the area where the ink gradation occurs, such as in the photograph area. The pixel intensity difference due to these acceptable printing variations must be differentiated from the pixel intensity difference due to the actual printing defect before an accurate inspection can be achieved.

Several devices and methods of inspecting printed material on a printing press using the reference image comparison process including compensating for the printing variation, have been disclosed in the prior art. However, those methods have severe limitations. They suffer from reduced sensitivity in the overall defect detection. This is caused by grouping the pixels into units of predetermined areas and determining an average intensity for the group. Groups of the target image are then compared to the corresponding groups of the reference image data. This grouping into units of predetermined areas is necessary because comparison of tone change recognition alone, i.e. intensity, on a pixel-by-pixel basis requires a significant amount of computational power in order to prevent false tone change recognition. An acceptable flaw detection sensitivity for a normally large area printing web requires a large number of digitized pixel elements across the printing image. Furthermore, on web printing systems, the web is run at speeds as high as 1200 feet per minute which require high data processing throughput.

U.S. Pat. No. 5,625,703 (1997, Okuda et al.) teaches a method and apparatus for detecting a defective printed matter in a printing press. Each pixel data of a printed matter is input as test image data. A change in tone, i.e. intensity, is recognized by accumulating and comparing the reference image data and the test image data in units of predetermined areas.

U.S. Pat. No. 5,144,566 (1992, Anderson et al.) teaches a print inspection method in which an area of printed material is optically scanned to obtain image data representing picture elements having variable intensity levels. This is achieved by counting the number of picture elements at a particular intensity level in the area scanned to thereby generate a frequency distribution of the intensity level of the image data in the area scanned. The frequency distribution generated is compared to a stored reference frequency distribution of intensity levels of the image data. A statistical comparison with the reference data is utilized to determine whether or not the printed material is satisfactory.

Therefore what is needed is an apparatus and process for inspecting print matter by comparing a target image to one or more reference images based on the classification and on the average intensity of each pixel. What is further needed is an apparatus and process of inspecting printed material capable of comparing the intensity according to the classification of each pixel of a target image to a reference image data on a web running at speeds as high as 1200 feet per minute while maintaining a high defect-detection sensitivity and a relatively low computational cost. What is still further needed is an apparatus and process of inspecting printed material by comparing the intensity according to the classification of each pixel while tolerating printing variations caused by web error of the printed matter.

SUMMARY OF THE INVENTION

It is an object of the present invention to provide an apparatus and process for inspecting printed matter which compares a target image to one or more reference images based on the classification and on the average intensity of each pixel. It is a further object of the present invention to provide an apparatus and process of inspecting printed matter capable of comparing the intensity of each pixel of a target image according to its classification to a reference image data on a web running a high speeds while maintaining a high defect-detection sensitivity and a relatively low computational cost. It is still a further object of the present invention to provide an apparatus and process of inspecting printed matter by comparing the intensity of each pixel according to its classification while tolerating printing variations caused by web error of the printed matter.

The apparatus and process of inspecting printed material consist of generating reference image data during setup using average maximum and minimum intensity values for each pixel from a plurality of reference images. In addition, a classification method is used which relates each reference pixel to one of eight different criteria based on their spatial location. Such criteria is applied during flaw detection as an adjustment to the dynamic detection sensitivity.

The target pixel to reference pixel comparison is accomplished using a 512×8 two-dimensional look-up table of flaw severity where each entry in the table contains a corresponding flaw severity code. The intensity offset and the eight detection criteria are indexed along an X and Y axis of the table, respectively. During setup, the reference address of each pixel is pre-calculated and associated to a proper entry of the look-up table. The reference address is determined in the Y direction based on the classification value of such pixel, and in the X direction by the intensity offset, called the center offset, of the average between the maximum and minimum intensity values of the reference pixels taken from the plurality of the reference images. When the process variation occurs, the reference address is updated to include the characteristics of this variation, while the original characteristics are preserved.

During defect detection, each inspected pixel intensity is subtracted from the corresponding reference address. The result of the subtraction is the address of the look-up table whose entry contains the flaw severity code of such pixel. The polarity of pixel subtraction is preserved by the flaw severity code, which is encoded in the look-up table by the relative X position from the center offset. Values to the right-hand side of the center offset of the look-up table indicates the intensity of the inspected pixel is darker than the intensity of the reference pixel, i.e. over inking. Values to the left-hand side of the center offset indicates the inspected pixel intensity is lighter than the reference pixel intensity, i.e. under inking.

Flaw detection is applied independently for each digitized pixel intensity of color separated red, green, and blue channels of the CCD sensor. The flawed pixels are weighted according to their flaw severity codes and then accumulated separately by the type of flaw, i.e. under inking or over inking. This generates the flaw grade values. The flaw grade values are compared to the proper threshold values, which are user specified, to obtain the final accept or reject decision.

DETAILED DESCRIPTION OF THE PREFERRED EMBODIMENT

The preferred embodiment of the present invention and the method of comparing the intensity or intensity gradient value of each pixel of a target image according to its classification to the corresponding pixel values of the reference pixel data are illustrated in FIGS. 1–6. Although the present invention is shown on a web printing press, it can also be used for detecting printing defects on a sheet-fed printing press.

Figure 1:
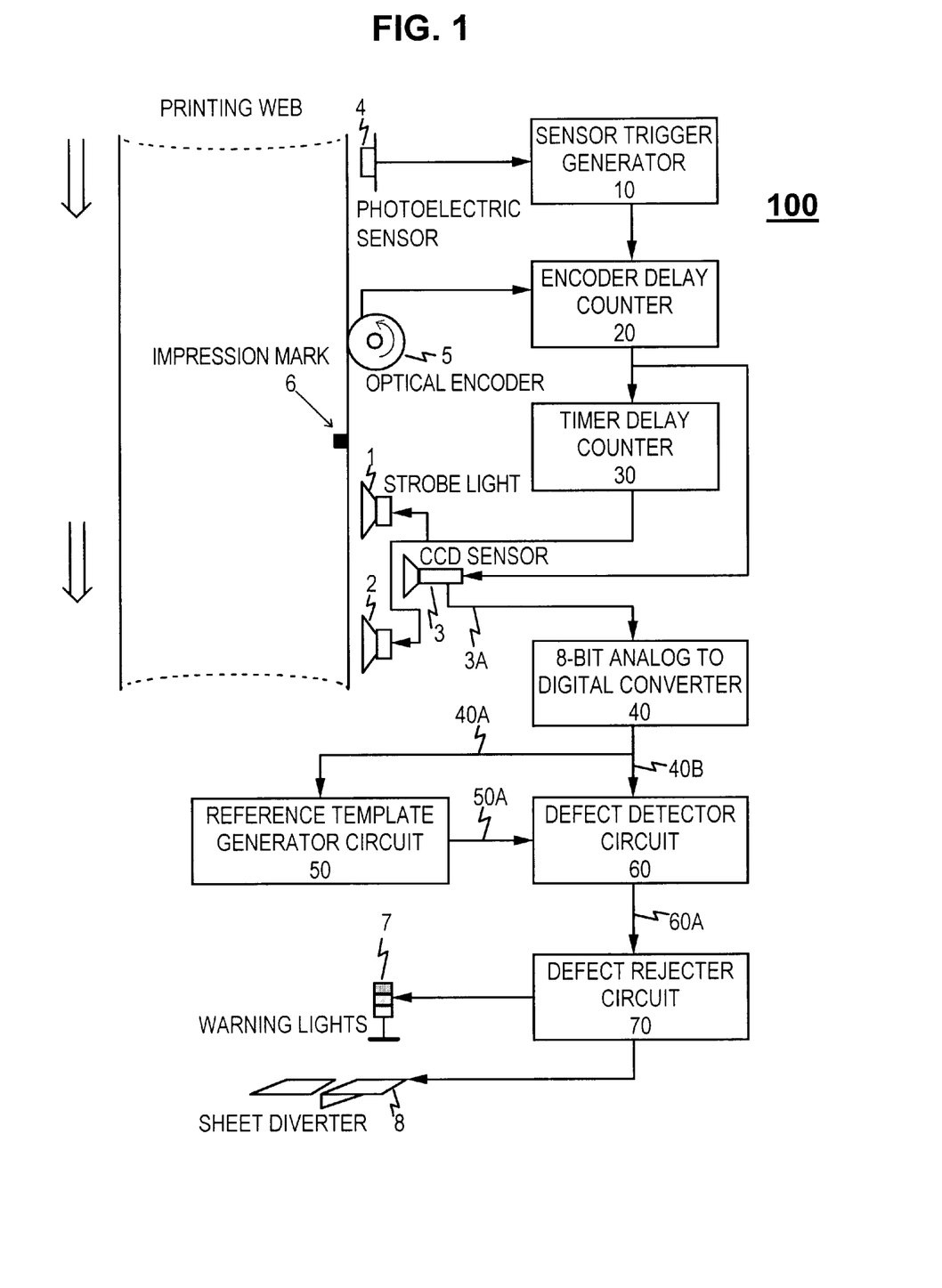
FIG. 1 is a schematic view of the present invention showing a print defect detection apparatus.

FIG. 1 shows a print defect detection apparatus 100. The print defect detection apparatus 100 initializes when a photoelectric sensor 4 detects an ink impression mark 6 indicating the start of the printing impression on the material which triggers a sensor trigger generator 10 to start an encoder delay counter 20. The encoder delay counter 20 accumulates the pulse generated from an optical encoder 5.

The accumulated encoder pulse indicates the distance the printing impression has traveled from the location of the photoelectric sensor 4. A CCD array sensor 3 is triggered to open its shutter when the printing impression reaches the array sensor 3 field of view location. It will be obvious to those skilled in the art that the CCD array sensor 3 may be a single channel (black and white), or a multi-channel (color) array sensor. The array sensor 3 may also be a line sensor, i.e. a line scan camera. A timer delay counter 30 is used to delay activating a strobe light 1 and a strobe light 2 for 30 micro seconds before simultaneously generating a short duration of high-intensity light strobe which freezes the image of the moving printing impression. The CCD array sensor 3 serves as an image pick-up device generating an analog signal 3a of the impression image on the printing web.

An 8-bit analog-to-digital converter 40 receives the analog signal 3a of the impression image, and converts it into a digital image representation. Optionally, the digital image representation can also be converted into an intensity gradient by subtracting the pixel intensity value of the previous pixel from the current pixel's intensity value. During initialization and setup, the digital image output from the analog-to-digital converter 40 is received by a reference template generator circuit 50, which creates a reference template. The reference template is created from a plurality of known good samples of the printing impression image.

During defect detection, the digital image of the unknown sample of the printing impression is received from the output of the analog-to-digital converter 40 by a defect detector circuit 60. A printing defect is detected by the defect detector circuit 60 using the previously calculated reference template, and is sent to a defect rejecter circuit 70. The defect rejecter circuit 70 evaluates the printing defect according to user criteria, and determines whether the printing impression should be accepted or rejected. Warning lights 7 consist of green, yellow, and red lights. Green is used to indicate acceptable printing quality. Yellow is used to warn that the printing quality is starting to degrade. Red is used as an alarm when a rejected printing quality is detected. A sheet diverter 8 is used to sort the rejected printed sheet from accepted printed sheets. It is obvious to one skilled in the art that if the present invention is used on a web press instead of a sheet-fed press, the sheet diverter 8 is located after sheet cutting is performed.

Figure 2:
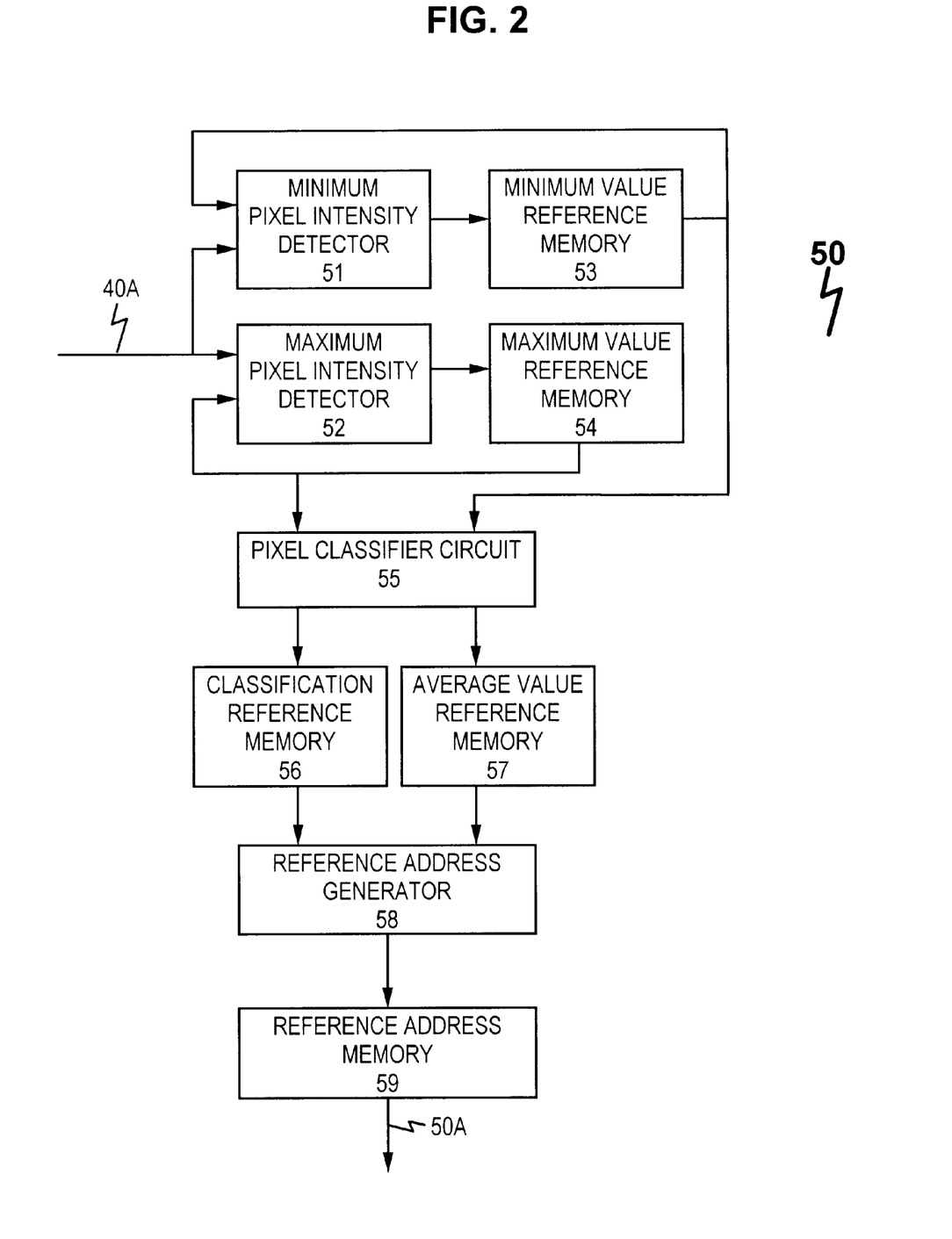
FIG. 2 is a block diagram of the present invention showing the reference template generator circuit.

FIG. 2 is a block diagram of the reference template generator circuit 50. The reference template is created from a plurality of known good samples of the printing impression during initialization and setup. The subsequent image of the known good samples can be registered digitally with respect to the image of the first good sample before they are being used in creating the reference template. A minimum value reference memory 53 and a maximum value reference memory 54 are initialized in the beginning with a maximum intensity or intensity gradient level of 255 and a minimum intensity or intensity gradient level of 0 respectively.

A minimum pixel intensity detector 51 receives the digital image of the known good sample from the output of the analog-to-digital converter 40 which is read through the memory bus 40a and compares it with the data stored in the minimum value reference memory 53. If the intensity or intensity gradient of a pixel in a captured image 40a is less than the intensity or intensity gradient of the corresponding pixel in the minimum value reference memory 53, the corresponding pixel in the minimum value reference memory 53 will be replaced with the pixel in the captured image 40a.

The same captured image of the known good sample 40a is also received by a maximum pixel intensity detector 52, and compares it with the data stored in the maximum value reference memory 54. If the intensity or intensity gradient of a pixel in the captured image 40a is greater than the intensity or intensity gradient of the corresponding pixel in the maximum value reference memory 54, the corresponding pixel in the maximum value reference memory 54 will be replaced with the pixel in the captured image 40a.

The above procedures are repeated for a number (n) of known good samples as specified by the user. When all of the images of the known good samples have been processed, the minimum value reference memory 53 and the maximum value reference memory 54 will contain the allowable range of intensity or intensity gradient for each pixel location in the image. This range of, the intensity variation must be allowed to tolerate variations in the printing process. At a later time when a new printing variation is spotted, the user can run this process again to update the minimum value reference memory 53 and the maximum value reference memory 54.

After all images of the known good samples have been collected, a pixel classifier circuit 55 calculates the average pixel intensity or intensity gradient values $I_{(x, y)}$ between the data stored in the minimum value reference memory 53 and the maximum value reference memory 54. The average pixel intensity or intensity gradient values are stored in an average value reference memory 57. The average pixel intensity or intensity gradient values are calculated using the following equation:

$$I_{(x,y)} = (R_{x,y}/2 + \text{MIN}[\text{MIN}_{(x,y)}, \text{MIN}_{(x-1,y)}, \text{MIN}_{(x+1,y)}, \text{MIN}_{(x,y-1)}, \text{MIN}_{(x,y+1)}] \quad \text{(Eq. 1)}$$

and, $$R_{(x,y)} = \text{MAX}[\text{MAX}_{(x,y)}, \text{MAX}_{(x-1,y)}, \text{MAX}_{(x+1,y)}, \text{MAX}_{(x,y-1)}, \text{MAX}_{(x,y+1)}] - \text{MIN}[\text{MIN}_{(x,y)}, \text{MIN}_{(x-1,y)}, \text{MIN}_{(x+1,y)}, \text{MIN}_{(x,y-1)}, \text{MIN}_{(x,y+1)}] \quad \text{(Eq. 2)}$$

where: $\text{MAX}_{(x, y)}$ is the pixel intensity or intensity gradient of the maximum value reference memory 54 at (x, y).

$\text{MIN}_{(x, y)}$ is the pixel intensity or intensity gradient of the minimum value reference memory 53 at (x, y).

The pixel classifier circuit 55 also determines the classification value $C_{(x, y)}$ for each pixel from the minimum value reference memory 53 and the maximum value reference memory 54, and stores the result into a classification reference memory 56. The classification value is calculated using the following formula:

$$C_{(x,y)} = \begin{cases} \mathcal{U}_{(x,y)} & \text{if } \mathcal{R}_{(x,y)} \leq \tau_{uniform} \\ 4 & \text{if } \tau_{uniform} < \mathcal{R}_{(x,y)} \leq \tau_{e4} \\ 3 & \text{if } \tau_{e4} < \mathcal{R}_{(x,y)} \leq \tau_{e3} \\ 2 & \text{if } \tau_{e3} < \mathcal{R}_{(x,y)} \leq \tau_{e2} \\ 1 & \text{if } \tau_{e2} < \mathcal{R}_{(x,y)} \leq \tau_{e1} \\ 0 & \text{if } \mathcal{R}_{(x,y)} > \tau_{e1} \end{cases} \quad \text{(Eq. 3)}$$

where, $$\mathcal{U}_{(x,y)} = \begin{cases} \mathcal{K}_{(x,y)} & \text{if } I_{(x,y)} < \tau_{substrate} \\ 7 & \text{otherwise} \end{cases}$$

and, $$\mathcal{K}_{(x,y)} = \begin{cases} 6 & \text{if } I_{(x,y)} > \tau_{light} \\ 5 & \text{otherwise} \end{cases}$$

Where: $\tau_{uniform}$ is a threshold of pixel intensity range to separate uniform/edge area.

$\tau_{substrate}$ is a threshold of pixel intensity value which separates ink/substrate.

$\tau_{light}$ is a threshold of pixel intensity value which separates light/dark ink.

$\tau_{e4}$ is a threshold of pixel intensity range for edge mask4.

$\tau_{e3}$ is a threshold of pixel intensity range for edge mask3.

$\tau_{e2}$ is a threshold of pixel intensity range for edge mask2.

$\tau_{e1}$ Is a threshold of pixel intensity range for edge mask1.

$I_{(x, y)}$ is the average value reference memory at (x,y) calculated from Eq. 1.

$R_{(x, y)}$ is the range of reference pixels at (x,y) calculated from Eq. 2.

$C_{(x, y)}$ is between 0–4 for the pixels that are located at the edge of the printing pattern, depending on range of the reference pixel intensity values. $C_{(x, y)}$ is equal to 5 if a pixel is located at the uniform dark ink area or 6 if it is located at the uniform light ink area. $C_{(x, y)}$ is equal to 7 if a pixel is located inside the substrate area.

A reference address generator 58 calculates the reference address value $A_{(x, y)}$ for each pixel, and stores the result in a reference address memory 59. The reference address value is calculated using the following equation:

$$A_{(x,y)} = G + [C_{(x,y)} * 2 * G] + I_{(x,y)} \quad \text{(Eq. 4)}$$

where: $C_{(x, y)}$ is the classification reference memory 56 at (x, y), calculated from Eq. 3.

$I_{(x, y)}$ is the average value reference memory 57 at (x, y), calculated from Eq. 1.

G is the gray scale range, which is $2^8 = 256$, for an 8-bit image digitizer.

The reference address $A_{(x, y)}$ points to the appropriate entry of the look-up table according to the pixel classification $C_{(x, y)}$, and is further center-offseted by the average reference pixel intensity or intensity gradient value $I_{(x, y)}$.

Figure 3:
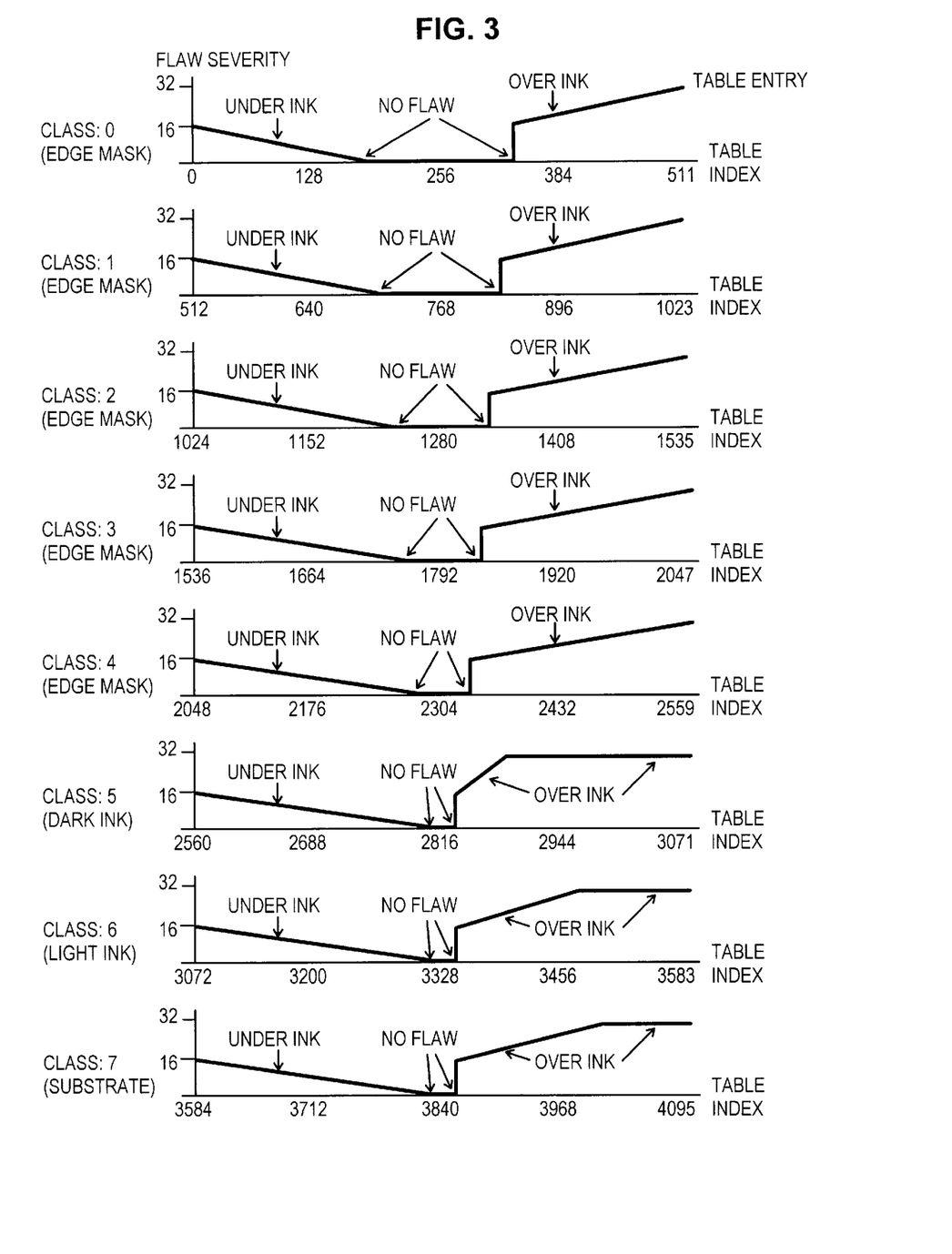
FIG. 3 is a graphic representation of the two dimensional look-up table of flaw severity of the present invention.

FIG. 3 shows a graphical representation of the typical content of the look-up table of the flaw severity. The table is two dimensional, 512×8, where the intensity or intensity gradient is indexed along the X axis, and the pixel classification is indexed along the Y axis. The table is stored in memory as a contiguous one dimensional data. The content of the look-up table determines the detection sensitivity associated with each classification of the pixel.

The flaw severity codes range from 0 to 32, where a flaw severity of 0 is assigned to a pixel that is not flawed. The flaw severity codes 1–16 are used to indicate that the corresponding pixel contains the under inking type of flaw. The flaw severity codes 17–32 are used to indicate the over inking type of flaw. The severeness of the flaw is increased in the order of the flaw severity code, provided that the flaw severity code 1 is equally as severe as the flaw severity code 17.

Figure 4:
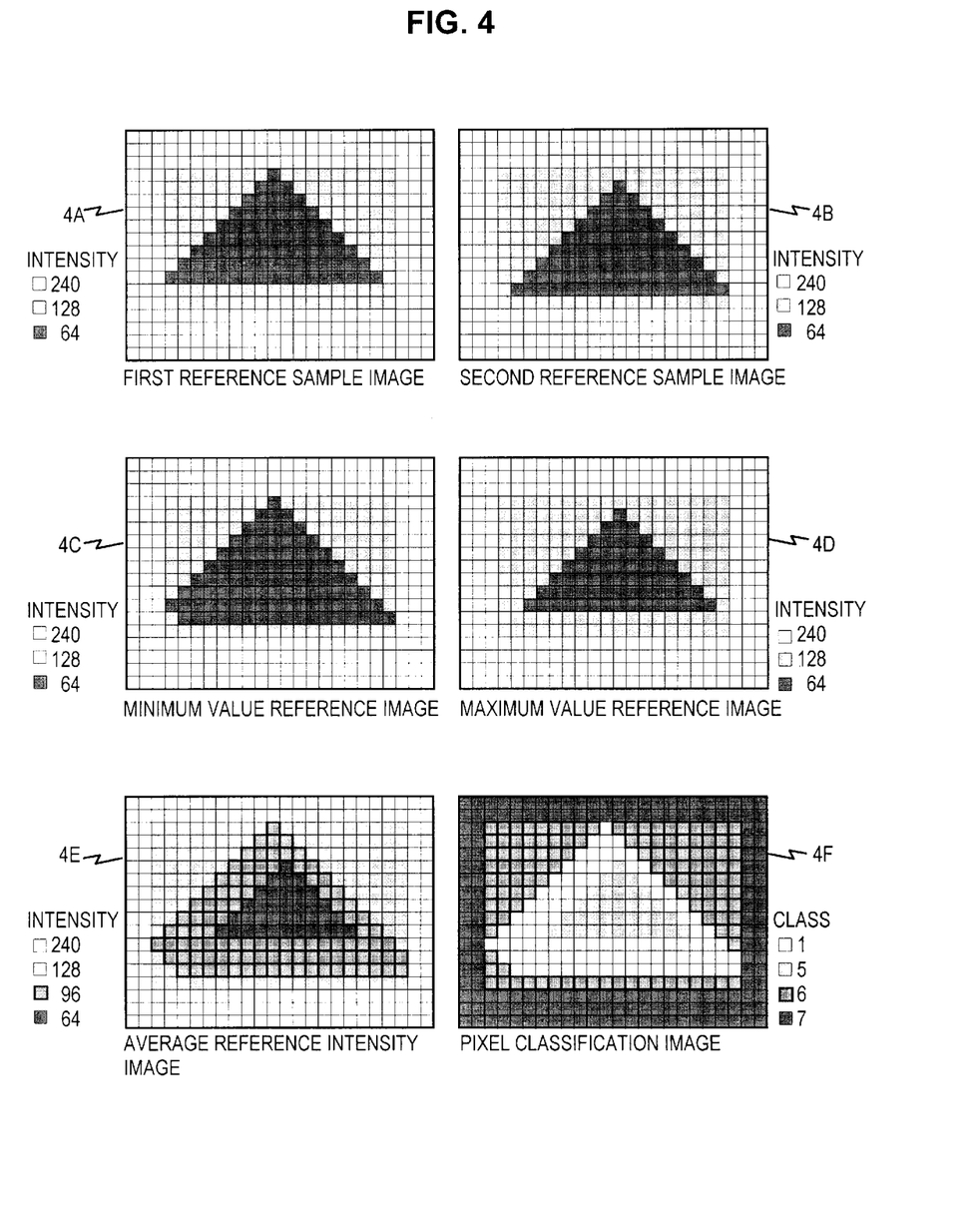
FIG. 4 is a graphic representation of the present invention illustrating the effect of printing variation to reference address.

FIG. 4 illustrates the effect of printing variation on the reference address. For illustrative purposes, the reference addresses in FIG. 4 are generated from two images of known good samples 4a and 4b. In this example, a dark triangular pattern is printed over a light rectangular pattern on the substrate. The triangular pattern of sample 4b is displaced by one pixel down and to the right compared with the triangular pattern of sample 4a.

The minimum value reference image 4c and the maximum value reference image 4d show the allowable intensity range for each pixel. This is based on the pixel intensity variation as it appeared in the reference samples 4a and 4b. The average reference intensity image 4e shows the result of applying Equation 1. The pixel classification image 4f is the result of applying Equation 3. In this example, the pixels are classified into four different classes. A high edge masking, class 1, is assigned to the pixels at the edge of the printing image corresponding to the areas where the triangular pattern moves. A dark ink region, class 5, is assigned to the pixels inside the triangular pattern that do not change in intensity in response to pattern movement. The light ink region, class 6, is assigned to the pixels inside the rectangular pattern that do not change in intensity in response to pattern movement. The pixels that are outside the printing patterns are assigned to class 7, a substrate region.

By applying the average reference intensity image 4e and the pixel classification image 4f into Equation 4, the reference addresses of the pixels in class 1 are equal to 864 and the reference addresses of the pixels in classes 5 and 6 are equal to 2880 and 3456, respectively. The reference addresses of the pixels in class 7 are equal to 4080. These reference addresses are created during initialization and setup, and are used by the defect detection apparatus through the indexing of the look-up table shown in FIG. 3. The pixel classification is therefore embedded in the reference address, which contains the detection sensitivity associated with such a classification.

Figure 5:
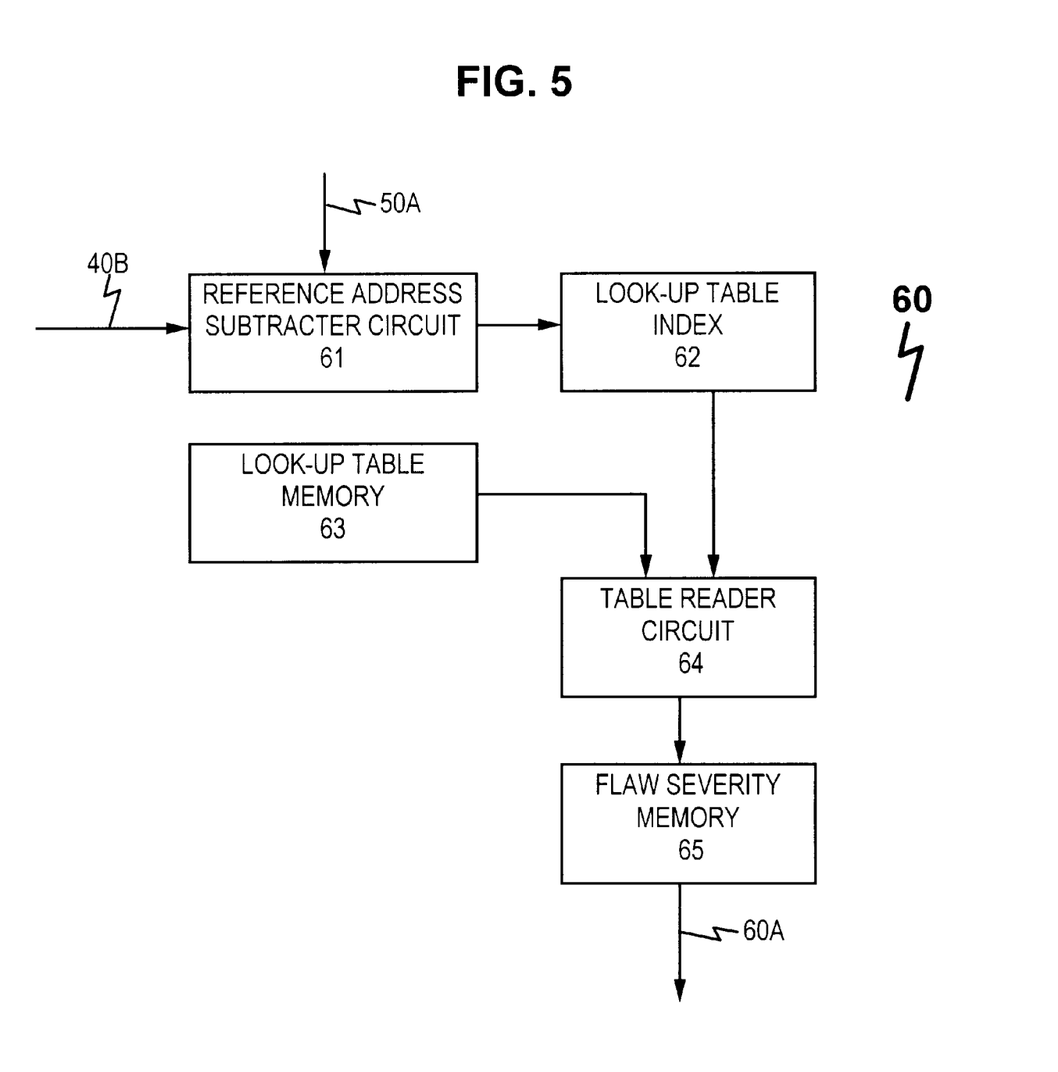
FIG. 5 is a block diagram of the defect detector circuit of the present invention.

FIG. 5 shows the block diagram of the defect detector circuit 60. A reference address subtracter circuit 61 reads a pixel intensity or intensity gradient value of the unknown image, which is read through the memory bus 40b from the analog-to-digital converter 40. The reference address subtracter circuit 61 subtracts the pixel intensity or intensity gradient value of the unknown image, from the reference address which is read from the reference address memory 59 through a memory bus 50a, and stores the result in the look-up table index 62. Optionally, the unknown image can be registered digitally with respect to the reference images before subtraction is performed. The table reader circuit 64 reads an entry of the look-up table memory 63 at the table index 62 which contains the flaw severity code of the corresponding pixel in the unknown image, and stores it in the flaw severity memory 65.

The effectiveness of the defect detection is clearly described through the illustration in FIG. 4 previously discussed. From FIG. 4, the reference addresses of the pixels that are located at the edge of the triangular printing pattern are assigned to class 1, which is in a category of a high edge masking. Also from FIG. 4, the average reference intensity of these pixels are determined to be 96. By applying the reference pixel class and intensity values into Equation 4, the reference addresses of these pixels are calculated to be equal to 864. The look-up table in FIG. 3 shows that subtracting the intensity of the corresponding pixel in the unknown image from this reference address will result in the over inking type of flaw (severity 17–32) if the intensity of the inspected pixel is less than 32. If the intensity of the inspected pixel is greater than 160, the result will be the under inking type of flaw (severity 1–16). If the intensity of the inspected pixel is between 32–160, the pixel is not flawed. It is obvious to those skilled in the art that the pixel subtracter circuit 61 may be replaced with a pixel adder circuit which would perform an addition instead of a subtraction. In such a case, Equation 4 would be modified to subtract instead of add the average value reference pixel $I_{(x, y)}$ from the address calculation. Thus, it is obvious to those skilled in the art that the look-up table index containing a proper flaw severity code of a particular pixel data of the unknown image may be obtained by either adding or subtracting the pixel intensity of the unknown image to the reference address, provided that the reference address is calculated by performing the proper complement of the above arithmetic operation on the average value reference pixel.

Figure 6:
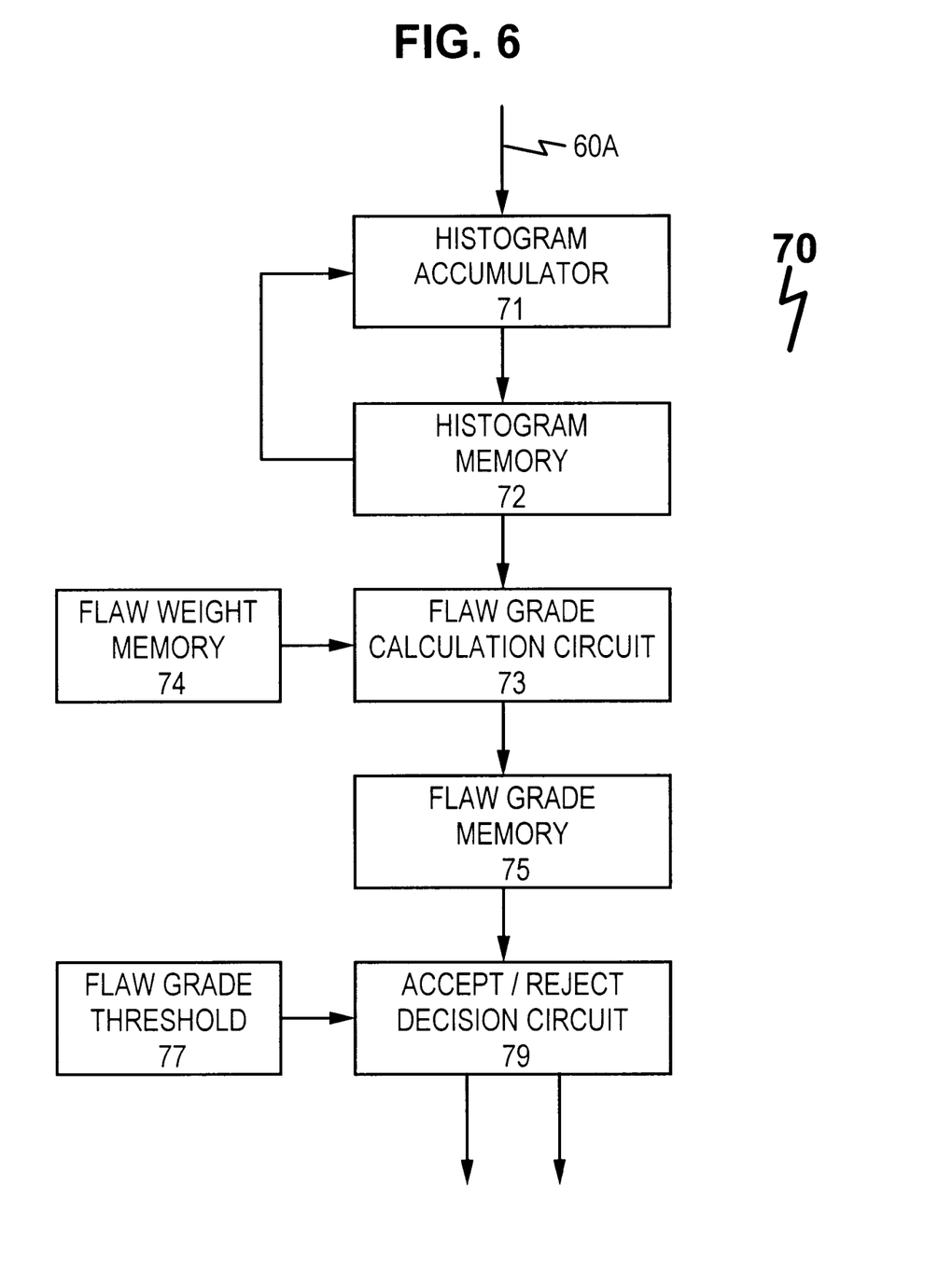
FIG. 6 is a block diagram of the defect rejecter circuit of the present invention.

FIG. 6 shows the block diagram of the defect rejecter circuit 70. A flaw histogram memory 72 is initially cleared to zero. The flaw histogram has 33 bins, which is one for each of the 32 flaw severity codes, plus one for the no flaw code. A histogram accumulator 71 reads the flaw severity memory 65 through a memory bus 60a, and the corresponding flaw severity bin in the flaw histogram memory 72. The corresponding flaw histogram bin is incremented by one and stored back into the flaw histogram memory 72. This process is repeated for all pixels in the image.

When all pixels in the image have been processed, a flaw grade calculation circuit 73 reads the flaw histogram memory 72, and a flaw weight memory 74 to calculate the flaw grade Fl for the under inking type of flaw, and the flaw grade Fd for the over inking type of flaw. The results are stored in the flaw grade memory 75 and calculated using the following equation:

$$Fl = \Sigma_{i=1-16}(H_i * W_i) \quad \text{(Eq. 5)}$$

$$Fd = \Sigma_{i=17-32}(H_i * W_i) \quad \text{(Eq. 6)}$$

where: $H_i$ is the histogram count of the occurrences of the flaw severity code i.

$W_i$ is the flaw weighting factor for the flaw at severity code i.

Since the severeness of the flaw is increased in the order of the flaw severity code, the flaw weighting factor $W_i$ is also increased in the order of i, for i=1–16, for the under inking type of flaw, and for i=17–32, for the over inking type of flaw.

The Accept/Reject decision circuit 79 reads the flaw grade memory 75, and compares it with the flaw grade threshold 77. The flaw grade threshold 77 contains the warning and reject thresholds for both under inking and over inking type of flaws selected by the user. If the flaw grade is below the warning threshold, the green warning light 7 is turned on, and the sheet diverter 8 is driven to the accept bin. If the flaw grade is above the warning threshold, but below the reject threshold, the yellow warning light 7 is turned on, and the sheet diverter 8 is driven to the accept bin. If the flaw grade is above the reject threshold, the red warning light 7 is turned on, and the sheet diverter 8 is driven to the reject bin.

It is obvious to those skilled in the art that the accumulated histogram of the occurrences of each of the flaw severity codes in histogram memory 72 can be compared directly against their corresponding threshold values to determine the acceptability of the target image without calculating the above under inking and over inking flaw grades.

I claim:

1. An apparatus for inspecting print article comprising:

a reference template generator circuit having a pixel intensity range circuit, a pixel classifier circuit and a reference address generator circuit wherein said reference address generator circuit further includes a reference address generator and a reference address memory for storing reference addresses from said reference address generator, and wherein said reference address generator calculates a reference address for each pixel data of said reference template based on multiplying a classification value of each pixel data by twice a gray scale range, center offsetting the result of said multiplying step by adding said gray scale range to said result, and adjusting said center offsetting calculation with a reference pixel intensity value for each of said pixel data;

a defect detector circuit for comparing a target image to said reference template, wherein said defect detector circuit further includes a reference address comparator circuit for comparing said reference address for each pixel data of said reference template to the pixel intensity value of a corresponding pixel data of said target image and wherein said comparison result is an index to a look-up table containing predetermined flaw severity codes; and a defect rejecter circuit for receiving output data from said defect detector circuit and for determining the acceptability of said target image.

2. The apparatus as claimed in claim 1 wherein said pixel intensity range circuit has a pixel intensity range detector and a reference memory for storing the pixel intensity range from said pixel intensity range detector.

3. The apparatus as claimed in claim 2 wherein said pixel intensity range detector further includes a maximum pixel intensity detector and a maximum reference memory for storing maximum pixel intensity values from said maximum pixel intensity detector and a minimum pixel intensity detector and a minimum reference memory for storing minimum pixel intensity values from said minimum pixel intensity detector.

4. The apparatus as claimed in claim 2 wherein said pixel classifier circuit further includes an average value reference memory for storing the average intensity values of said pixel intensity range and a classification reference memory for storing the classification values calculated from said pixel intensity range.

5. The apparatus as claimed in claim 4 wherein said reference addresses are calculated using said average intensity values and said classification values of said pixel classifier circuit.

6. The apparatus as claimed in claim 1 wherein said defect detector circuit further includes a table reader circuit for acquiring one of said flaw severity codes in said look-up table memory at said look-up table index, and a flaw severity memory for storing said corresponding flaw severity code.

7. The apparatus as claimed in claim 1 wherein said defect rejecter circuit comprising:

a histogram accumulator circuit for receiving said output data from said defect detector circuit wherein said accumulator circuit accumulates the count of occurrences of said output data having particular flaw severity codes and stores said accumulated count of said occurrences into a histogram memory;

a flaw grade calculation circuit for calculating the flaw grades by reading said count of occurrences of each of said flaw severity codes from said histogram memory and the corresponding flaw weight values from a flaw weight memory; and an accept-reject decision circuit for receiving said flaw grade values and comparing said flaw grade values to the flaw grade threshold values.

8. The apparatus as claimed in claim 1 wherein said apparatus further includes an optical digitizing circuit for capturing at least one reference image and a target image.

9. The apparatus as claimed in claim 8 wherein said optical digitizing circuit has at least one capturing channel.

10. A method of inspecting print article comprising:

creating a reference template from at least one reference image by calculating a reference address for each pixel data of said reference template, said calculating step comprising the steps of:
   multiplying a classification value of each pixel data by twice a gray scale range;
   center offsetting the result of said multiplying step by adding said gray scale range to said result; and
   adjusting said center offsetting step result with a reference pixel intensity value for each of said pixel data;
storing said reference template;
comparing each pixel intensity of a target image to a corresponding pixel data stored in said reference template;
using the result of said comparing step as an index to a look-up table containing the predetermined flaw severity codes;
reading an entry of said look-up table at said look-up table index to obtain a flaw severity code of said pixel data in said target image;
aggregating the occurrences of said flaw severity codes in said target image; and
comparing said aggregated flaw occurrences to at least one threshold value to determine the acceptability of said target image.

11. The method as claimed in claim 10 wherein said reference pixel intensity value for each pixel data is an average pixel intensity value determined from a plurality of reference images.

12. The method as claimed in claim 10 wherein said pixel intensity of each of said pixel data of said target image in said comparing step is subtracted from said reference address generating a difference value wherein said difference value is an index to an entry of said look-up table containing a flaw severity code corresponding to said pixel data.

13. The method as claimed in claim 10 wherein said pixel intensity of each of said pixel data of said target image in said comparing step is added to said reference address generating a sum value wherein said sum value is an index to an entry of said look-up table containing a flaw severity code corresponding to said pixel data.

14. The method as claimed in claim 10 wherein said method is applied to each channel on a multiple channel image.

15. The method as claimed in claim 10 wherein said method is applied to a single channel image.

16. The method as claimed in claim 10 wherein said method is applied to a row of data from a line scan camera.

17. The method as claimed in claim 10 wherein said pixel intensity value is a pixel intensity gradient value.

18. The method as claimed in claim 10 wherein said reference pixel intensity value and said pixel classification value for each pixel data is determined from a minimum pixel intensity and a maximum pixel intensity of each pixel data calculated from at least one reference image.

19. The method as claimed in claim 18 wherein said minimum pixel intensity is determined from the least minimum of the minimum intensities of said pixel data and the adjacent pixel data, and wherein said maximum pixel intensity is determined from the highest maximum of the maximum intensities of said pixel data and the adjacent pixel data.

20. The method as claimed in claim 19 wherein said pixel classification value for each pixel data is assigned to a pixel class wherein said pixel class is one of eight pixel classes selected from the group consisting of edge mask classes, ink category classes and a substrate class, said assignment to said pixel class depending on said reference pixel intensity value and on the pixel intensity range of each pixel data calculated by subtracting said least minimum of the minimum intensities of said pixel data and the adjacent pixel data from said highest maximum of the maximum intensities of said pixel data and the adjacent pixel data.

21. The method as claimed in claim 18 wherein said minimum pixel intensity and said maximum pixel intensity is undated when the process variation is detected.

22. The method as claimed in claim 10 wherein said aggregating step comprising:
   accumulating a histogram of the occurrences of each of said flaw severity codes in said target image;
   multiplying said occurrences of each of said flaw severity codes with a predetermined weighting factor of each of said flaw severity codes;
   grouping each of said multipliers into under inking or over inking types of said flaw severity codes;
   summing said under inking multipliers to obtain the under inking flaw grade value, and summing said over inking multipliers to obtain the over inking flaw grade value; and
   comparing said under inking flaw grade value to an under inking flaw grade threshold and said over inking flaw grade value to an over inking flaw grade threshold to determine the acceptability of said target image.

23. The method as claimed in claim 10 wherein said aggregating step comprising:
   accumulating the occurrences of each of said flaw severity codes in said target image into histogram bins; and
   comparing each of said histogram bins to the corresponding threshold values to determine the acceptability of said target image.

24. The method as claimed in claim 10 wherein said step of comparing said aggregated flaw occurrences further comprising comparing said aggregated flaw occurrences to a warning threshold and a reject threshold wherein said target image is accepted when said aggregated result is less than said warning threshold, and wherein said target image is accepted with a warning when said aggregated result is equal to or greater than said warning threshold but is less than said reject threshold, and wherein said target image is rejected when said aggregated result is equal to or greater than said reject threshold.

25. The method as claimed in claim 10 wherein said step of creating said reference template further includes digitally registering subsequent reference images with respect to the first reference image before creating said reference template.

26. The method as claimed in claim 10 wherein said target image is digitally registered with respect to said at least one reference image before comparing each pixel intensity of said target image to said corresponding pixel data stored in said reference template.

27. The method as claimed in claim 10 wherein said step of adjusting said center offsetting step includes
   adding said reference pixel intensity value to said center offsetting step result.

28. The method as claimed in claim 10 wherein said step of adjusting said center offsetting step includes subtracting said reference pixel intensity value from said center offsetting step result.

29. The method as claimed in claim 10 wherein said predetermined flaw severity codes for each classification value contained in said look-up table are separated within each of said classification values in said look-up table into groups of under inking, over inking and no flaw types of said flaw severity codes.

30. The method as claimed in claim 10 wherein said look-up table containing said predetermined flaw severity codes is updated when the detection sensitivity is changed.

31. A program product comprising:
  a computer usable medium having computer readable program code means embodied therein for detecting pattern flaws, said computer readable program code means in said program product comprising:
    computer readable first program code means for causing the computer to effect creating a reference template from at least one reference image by calculating a reference address for each pixel data of said reference template, said calculating step comprising the steps of:
      multiplying a classification value of each pixel data by twice a gray scale range;
      center offsetting the result of said multiplying step by adding said gray scale range to said result; and
      adjusting said center offsetting step result with a reference pixel intensity value for each of said pixel data;
    computer readable second program code means for causing the computer to effect storing said reference template;
    computer readable third program code means for causing the computer to effect comparing each pixel intensity of a target image to a corresponding pixel data stored in said reference template;
    computer readable fourth program code means for causing the computer to effect using the result of said comparing step as an index to a look-up table containing predetermined flaw severity codes;
    computer readable fifth program code means for causing the computer to effect reading an entry of said look-up table at said look-up table index to obtain a flaw severity code of said pixel data in said target image;
    computer readable sixth program code means for causing the computer to effect aggregating the occurrences of said flaw severity codes in said target image; and
    computer readable seventh program code means for causing the computer to effect comparing said aggregated flaw occurrences to at least one threshold value and determining the acceptability of said target image.

* * * * *

UNITED STATES PATENT AND TRADEMARK OFFICE
CERTIFICATE OF CORRECTION

PATENT NO : 5,999,636
DATED : December 7, 1999
INVENTOR(S) : Ruddy J. Juang

It is certified that error appears in the above-identified patent and that said Letters Patent is hereby corrected as shown below:

Equation 1, column 6, lines 12-13, substitute -- $I_{(x, y)} = (R_{(x, y)} / 2) + \text{MIN} [\text{MIN}_{(x, y)}, \text{MIN}_{(x-1, y)}, \text{MIN}_{(x+1, y)}, \text{MIN}_{(x, y-1)}, \text{MIN}_{(x, y+1)}]$ -- therefor.

Claim 21, column 12, change "undated" to --updated--.

Signed and Sealed this

Eleventh Day of July, 2000

*Attest:*

Q. TODD DICKINSON

*Attesting Officer*     *Director of Patents and Trademarks*